US012662121B2

(12) United States Patent　　(10) Patent No.:　US 12,662,121 B2
Park　　(45) Date of Patent:　Jun. 23, 2026

(54) APPARATUS AND METHOD FOR CONTROLLING THE SAME

(71) Applicant: HL KLEMOVE CORP., Incheon (KR)

(72) Inventor: Jiyeol Park, Seoul (KR)

(73) Assignee: HL KLEMOVE CORP., Incheon (KR)

( * ) Notice: Subject to any disclaimer, the term of this patent is extended or adjusted under 35 U.S.C. 154(b) by 298 days.

(21) Appl. No.: 18/143,238

(22) Filed: May 4, 2023

(65) Prior Publication Data

US 2023/0356716 A1　Nov. 9, 2023

(30) Foreign Application Priority Data

May 4, 2022　(KR) ......................... 10-2022-0055397

(51) Int. Cl.
B60W 30/16　　　(2020.01)
(52) U.S. Cl.
CPC ....... B60W 30/16 (2013.01); B60W 2420/403 (2013.01); B60W 2420/408 (2024.01); B60W 2552/53 (2020.02); B60W 2554/4041 (2020.02); B60W 2554/80 (2020.02)
(58) Field of Classification Search
CPC ............. B60W 30/16; B60W 2552/53; B60W 2554/4045; B60Q 1/26; B60K 2310/30
See application file for complete search history.

(56) References Cited

U.S. PATENT DOCUMENTS

| | | | | |
|---|---|---|---|---|
| 9,393,963 | B2 * | 7/2016 | Slaton ................. | B60W 30/146 |
| 10,486,707 | B2 * | 11/2019 | Zelman ........... | B60W 30/18154 |
| 2017/0341647 | A1 * | 11/2017 | Rajvanshi ....... | B60W 60/00274 |
| 2022/0024461 | A1 * | 1/2022 | Takei ................... | G08G 1/0145 |

FOREIGN PATENT DOCUMENTS

| | | | |
|---|---|---|---|
| DE | 102016211208 | * | 12/2017 |
| JP | S63151538 A | * | 6/1988 |
| JP | 2000057500 | * | 2/2000 |
| JP | 2019-218004 | | 12/2019 |
| KR | 10-2020-0116181 | | 10/2020 |

OTHER PUBLICATIONS

Office Action dated Oct. 2, 2025 for Korean Patent Application No. 10-2022-0055397and Its English translation provided by Applicant's foreign counsel.

* cited by examiner

*Primary Examiner* — Christian Chace
*Assistant Examiner* — Minato Lee Horner
(74) *Attorney, Agent, or Firm* — WOMBLE BOND DICKINSON (US) LLP

(57) ABSTRACT

An apparatus for driver assistance includes a controller detecting a preceding vehicle traveling in front of a host vehicle based on data output from at least one of a camera, a radar, and a light detection and ranging (LiDAR) and performing adaptive cruise control (ACC) maintaining a target inter-vehicle distance between the host vehicle and the preceding vehicle. The controller identifies whether the preceding vehicle is cutting out of a traveling lane according to movement of the preceding vehicle during the ACC, identify whether another lane to which the preceding vehicle is cutting in is a lane allowing the preceding vehicle to cut in in response to the preceding vehicle being cutting out of the traveling lane, and shorten the target inter-vehicle distance of the ACC in response to the another lane to which the preceding vehicle is cutting in being the lane allowing the preceding vehicle to cut in.

15 Claims, 7 Drawing Sheets

SECOND TARGET INTER-VEHICLE DISTANCE

FIRST TARGET INTER-VEHICLE DISTANCE

FIG. 7

SECOND TARGET INTER-VEHICLE DISTANCE

FIRST TARGET INTER-VEHICLE DISTANCE

APPARATUS AND METHOD FOR CONTROLLING THE SAME

CROSS-REFERENCE TO RELATED APPLICATION

This application claims the benefit of Korean Patent Application No. 10-2022-0055397, filed on May 4, 2022 in the Korean Intellectual Property Office, the disclosure of which is incorporated herein by reference.

BACKGROUND

1. Field

Embodiments of the present disclosure relate to an apparatus and method for maintaining a distance to a preceding vehicle.

2. Description of the Related Art

Recently, research on vehicles equipped with an advanced driver assist system (ADAS) for actively providing information on vehicle conditions, driver conditions, and/or nearby environments in order to reduce a driver's burden and enhance convenience is actively progressing.

As one example of an ADAS, an adaptive cruise control (ACC) system is a convenience function for automatically maintaining an appropriate inter-vehicle distance to a preceding vehicle by detecting a distance to and a speed of the preceding vehicle using a radar mounted on a front portion of a host vehicle and automatically decelerating or accelerating the host vehicle without a driver's intervention.

An ACC system finds a target vehicle using a radar mounted on a vehicle. The conventional ACC system excludes a preceding vehicle from the target vehicle only when the preceding vehicle is out of a traveling lane regardless of whether the preceding vehicle is cutting out of a lane.

In this case, when the preceding vehicle suddenly cuts out of the traveling lane, the host vehicle may suddenly accelerate, thereby giving a driver a sense of heterogeneity. For example, there may be a case in which the host vehicle momentarily accelerates significantly and then suddenly decelerates to maintain an inter-vehicle distance to a vehicle in front of the preceding vehicle after the preceding vehicle has cut out of the lane, which may not only give a driver a great sense of heterogeneity but also may be disadvantageous in terms of fuel efficiency.

SUMMARY

Therefore, it is an aspect of the present disclosure to provide an apparatus and method capable of preventing unnecessary deceleration and acceleration of a host vehicle when a preceding vehicle cuts out of a lane on which a host vehicle travels.

Additional aspects of the disclosure will be set forth in part in the description which follows and, in part, will be obvious from the description, or may be learned by practice of the disclosure.

In accordance with one aspect of the present disclosure, an apparatus includes a sensor including at least one of a camera, a radar, and a light detection and ranging (LiDAR), and a controller configured to detect a preceding vehicle that travels in front of a host vehicle based on data output from the sensor, and perform adaptive cruise control (ACC) that maintains a target inter-vehicle distance between the host vehicle and the preceding vehicle. The controller may identify whether the preceding vehicle is cutting out of a traveling lane according to movement of the preceding vehicle during the ACC, identify whether another lane to which the preceding vehicle is cutting in is a lane allowing the preceding vehicle to cut in in response to the preceding vehicle being cutting out of the traveling lane, and shorten the target inter-vehicle distance of the ACC in response to the another lane to which the preceding vehicle is cutting in being the lane allowing the preceding vehicle to cut in.

The controller may identify whether the host vehicle continuously travels straight and identify whether the preceding vehicle is cutting out of the traveling lane when the host vehicle continuously traveling straight.

The controller may identify that that the host vehicle continuously travels straight in response to no intersections or traffic lights in a predetermined forward section.

The controller may identify whether an exit point at which the host vehicle exits is present in a predetermined forward section based on a traveling path to a destination set in a navigation device, and identify that the host vehicle continuously travels straight on the basis of no exit point in the predetermined forward section.

The controller may acquire a lateral position of the preceding vehicle and a lateral speed of the preceding vehicle, identify whether a turn signal of the preceding vehicle is turned on, and identify whether the preceding vehicle is cutting out of the traveling lane according to the lateral position of the preceding vehicle, the lateral speed of the preceding vehicle and the identifying of whether the turn signal of the preceding vehicle is turned on.

The controller may identify that the preceding vehicle is cutting out of the traveling lane in response to at least one of: a lateral speed of the preceding vehicle being higher than or equal to a preset speed, a lateral distance between a lane marker in the direction in which the preceding vehicle laterally moves and the preceding vehicle being smaller than or equal to a preset distance, and the identifying of that the turn signal is turned on.

The controller may identify that the another lane to which the preceding vehicle is cutting in is the lane allowing the preceding vehicle to cut in when the another lane to which the preceding vehicle is cutting in is not a bus lane, a lane under construction, a restricted lane, or a lane that is ending.

The controller may acquire a relative distance and a relative speed between the host vehicle and another vehicle in front of the preceding vehicle when the another vehicle in front of the preceding vehicle travels in front of the preceding vehicle, and shorten the target inter-vehicle distance of the ACC on the basis of the relative distance and the relative speed.

The controller may shorten the target inter-vehicle distance of the ACC on the basis of the relative distance being greater than or equal to a preset distance and the relative speed being higher than or equal to a preset speed.

In accordance with another aspect of the present disclosure, a method includes detecting a preceding vehicle that travels in front of a host vehicle based on data output from at least one of a camera, a radar, and a light detection and ranging (LiDAR), performing adaptive cruise control (ACC) that maintains a target inter-vehicle distance between the host vehicle and the preceding vehicle, identifying whether the preceding vehicle is cutting out of a traveling lane according to movement of the preceding vehicle during the ACC, identifying whether another lane to which the preceding vehicle is cutting in is a lane allowing the preceding vehicle to cut in in response to the preceding vehicle being cutting out of the traveling lane, and shortening the target inter-vehicle distance of the ACC in response to the another lane to which the preceding vehicle is cutting in being the lane allowing the preceding vehicle to cut in.

The identifying of whether the preceding vehicle is cutting out of the traveling lane may include identifying whether the host vehicle continuously travels straight and identifying whether the preceding vehicle is cutting out of the traveling lane in response to the host vehicle continuously traveling straight.

The identifying of whether the host vehicle continuously travels straight may include identifying that the host vehicle continuously travels straight in response to no intersections or traffic lights in a predetermined forward section.

The identifying of whether the host vehicle continuously travels straight may include identifying whether an exit point at which the host vehicle exits is present in a predetermined forward section based on a traveling path to a destination set in a navigation device and identifying that the host vehicle continuously travels straight on the basis of no exit point in the predetermined forward section.

The identifying of whether the preceding vehicle is cutting out of the traveling lane may include acquiring a lateral position of the preceding vehicle and a lateral speed of the preceding vehicle, identifying whether a turn signal of the preceding vehicle is turned on, and identifying whether the preceding vehicle is cutting out of the traveling lane according to the lateral position of the preceding vehicle, the lateral speed of the preceding vehicle and the identifying of whether the turn signal of the preceding vehicle is turned on.

The identifying of whether the preceding vehicle is cutting out of the traveling lane may include identifying that the preceding vehicle is cutting out of the traveling lane in response to at least one of: a lateral speed of the preceding vehicle being higher than or equal to a preset speed, a lateral distance between a lane marker in the direction in which the preceding vehicle laterally moves and the preceding vehicle being smaller than or equal to a preset distance, and the identifying of that the turn signal is turned on.

The identifying of whether the another lane to which the preceding vehicle is cutting in is the lane allowing the preceding vehicle to cut in may include identifying that the another lane to which the preceding vehicle is cutting in is the lane allowing the preceding vehicle to cut in when the another lane to which the preceding vehicle is cutting in is not a bus lane, a lane under construction, a restricted lane, or a lane that is ending.

The shortening of the target inter-vehicle distance of the ACC may include acquiring a relative distance and a relative speed between the host vehicle and another vehicle in front of the preceding vehicle when the another vehicle in front of the preceding vehicle travels in front of the preceding vehicle, and shortening the target inter-vehicle distance of the ACC on the basis of the relative distance and the relative speed.

The shortening of the target inter-vehicle distance of the ACC may include shortening the target inter-vehicle distance of the ACC on the basis of the relative distance being greater than or equal to a preset distance and the relative speed being higher than or equal to a preset speed.

In accordance with still another aspect of the present disclosure, a computer-readable record medium includes instructions or execution code for detecting a preceding vehicle that travels in front of a host vehicle based on data output from at least one of a camera, a radar, and a light detection and ranging (LiDAR), performing adaptive cruise control (ACC) that maintains a target inter-vehicle distance between the host vehicle and the preceding vehicle, identifying whether the preceding vehicle is cutting out of a traveling lane according to movement of the preceding vehicle during the ACC, identifying whether another lane to which the preceding vehicle is cutting in is a lane allowing the preceding vehicle to cut in in response to the preceding vehicle being cutting out of the traveling lane, and shortening the target inter-vehicle distance of the ACC in response to the another lane to which the preceding vehicle is cutting in being the lane allowing the preceding vehicle to cut in.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 7 is a view illustrating correcting a target inter-vehicle distance by the apparatus for driver assistance according to one embodiment.

DETAILED DESCRIPTION

Figure 1:
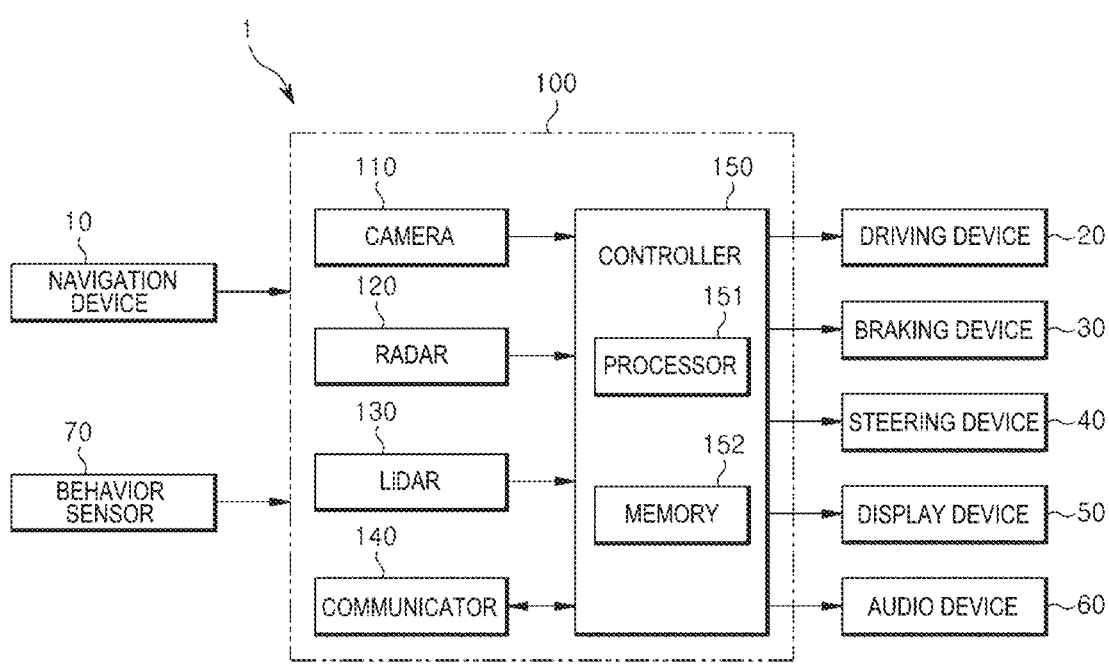
FIG. 1 is a view illustrating a configuration of an apparatus for driver assistance and a vehicle to which the apparatus for driver assistance is applied according to one embodiment.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 2:
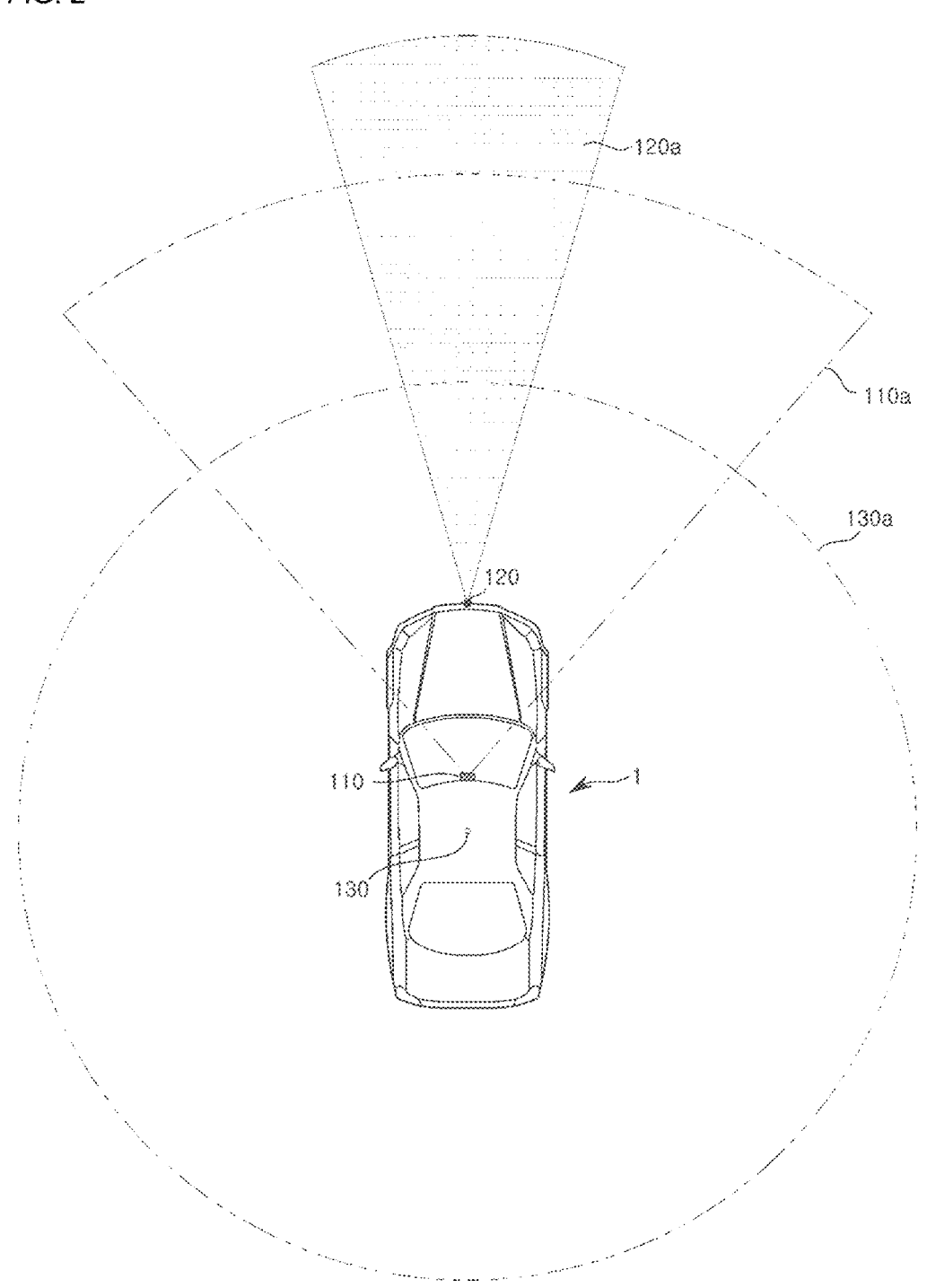
FIG. 2 is a view illustrating fields of view of a camera, a radar, and a light detection and ranging (LiDAR) included in the apparatus for driver assistance according to one embodiment.

FIG. 1 is a view illustrating a configuration of an apparatus for driver assistance and a vehicle to which the apparatus for driver assistance is applied according to one embodiment. FIG. 2 is a view illustrating fields of view of a camera, a radar, and a LiDAR included in the apparatus for driver assistance according to one embodiment.

Referring to FIG. 1, a vehicle 1 may include a navigation device 10, a driving device 20, a braking device 30, a steering device 40, a display device 50, an audio device 60, a behavior sensor 70, and/or an apparatus for driver assistance 100.

The navigation device 10, the driving device 20, the braking device 30, the steering device 40, the display device 50, the audio device 60, the behavior sensor 70, and/or the apparatus for driver assistance 100 may communicate with one another via a communication network NT. For example, the electric devices 10, 20, 30, 40, 50, 60, 70, and 100 included in the vehicle 1 may transmit or receive data via Ethernet, media oriented systems transport (MOST), Flexray, controller area network (CAN), local interconnect network (LIN), or the like.

The navigation device 10 may generate a path to a destination input by a driver and provide the generated path to the driver. The navigation device 10 may receive global navigation satellite system (GNSS) signals from a GNSS and identify an absolute position (coordinates) of the vehicle 1 based on the GNSS signals. The navigation device 10 may generate the path to the destination based on the position (coordinates) of the destination input by the driver and the current position (coordinates) of the vehicle 1.

The navigation device 10 may provide map data and position information of the vehicle 1 to the apparatus for driver assistance 100. In addition, the navigation device 10 may provide information on the path to the destination to the apparatus for driver assistance 100. For example, the navigation device 10 may provide the apparatus for driver assistance 100 with information on a road on which the vehicle 1 travels (a bus lane, a lane under construction, a restricted lane, a lane that is ending, or the like).

The driving device 20 may move the vehicle 1 and include, for example, an engine, an engine management system (EMS), a transmission, and a transmission control unit (TCU). The engine may generate power for the vehicle 1 to drive, and the EMS may control the engine in response to a driver's acceleration intention through an accelerator pedal or a request of the apparatus for driver assistance 100. The transmission may transmit the power generated by the engine to wheels for deceleration, and the transmission control unit may control the transmission in response to the driver's transmission command through a transmission lever and/or a request of the apparatus for driver assistance 100.

The braking device 30 may stop the vehicle 1 and include, for example, a brake caliper and a brake control module (EBCM). The brake caliper may decelerate the vehicle 1 or stop the vehicle 1 using friction with a brake disc, and the EBCM may control the brake caliper in response to the driver's braking intention through a brake pedal and/or a request of the apparatus for driver assistance 100. For example, the EBCM may receive a deceleration request including a deceleration from the apparatus for driver assistance 100 and electrically or hydraulically control the brake caliper so that the vehicle 1 is decelerated depending on the requested deceleration.

The steering device 40 may include an electronic power steering control module (EPS). The steering device 40 may change a traveling direction of the vehicle 1, and the EPS may assist an operation of the steering device 40 in response to the driver's steering intention through the steering wheel so that the driver may easily operate the steering wheel. In addition, the EPS may control the steering device in response to a request of the apparatus for driver assistance 100. For example, the EPS may receive a steering request including a steering torque from the apparatus for driver assistance 100 and control the steering device to steer the vehicle 1 depending on the requested steering torque.

The display device 50 may include a cluster, a head-up display, a center fascia monitor, and the like and provide various types of information and entertainment to the driver through images and sounds. For example, the display device 50 may provide traveling information of the vehicle 1, a warning message, and the like to the driver.

The audio device 60 may include a plurality of speakers and provide various types of information and entertainment to the driver through sounds. For example, the audio device 60 may provide traveling information of the vehicle 1, a warning message, and the like to the driver.

The behavior sensor 70 may acquire behavior data representing the movement of the vehicle 1. For example, the behavior sensor 70 may include a speed sensor for detecting a wheel speed, an acceleration sensor for detecting a lateral acceleration and a longitudinal acceleration of the vehicle 1, a yaw rate sensor for detecting a yaw rate of the vehicle, a steering angle sensor for detecting a steering angle of a steering wheel, a torque sensor for detecting a steering torque of the steering wheel, and/or a turn signal sensor for detecting operation information of a turn signal. The behavior data may include the wheel speed, the lateral acceleration, the longitudinal acceleration, the yaw rate, the steering angle, the steering torque, the operation information of the turn signal, etc.

The apparatus for driver assistance 100 may communicate with the navigation device 10, the driving device 20, the braking device 30, the steering device 40, the display device 50, the audio device 60, and the behavior sensor 70 via a vehicle communication network. The apparatus for driver assistance 100 may receive information on the path to the destination and the position information of the vehicle 1 from the navigation device 10 and receive information on the wheel speed, lateral acceleration, longitudinal acceleration, yaw rate, steering angle, and/or steering torque of the vehicle 1 from the behavior sensor 70.

The apparatus for driver assistance 100 may provide various functions for safety to the driver. For example, the apparatus for driver assistance 100 may provide an adaptive cruise control (ACC) function. In addition, the apparatus for driver assistance 100 may provide functions for lane departure warning (LDW), lane keeping assist (LKA), high beam assist (HBA), autonomous emergency braking (AEB), traffic sign recognition (TSR), blind spot detection (BSD), traffic jam assist (TJA), and the like.

The apparatus for driver assistance 100 may include a camera 110, a radar 120, a LiDAR 130, a communicator 140, and a controller 150. The apparatus for driver assistance 100 is not limited to that shown in FIG. 1. For example, at least one detector among the camera 110, the radar 120, and the LiDAR 130 is omitted from the apparatus for driver assistance 100 shown in FIG. 1, or various detectors capable of detecting nearby objects of the vehicle 1 may be added thereto.

The camera 110, the radar 120, the LiDAR 130, the communicator 140, and the controller 150 may be provided separately from each other. For example, the controller 150 may be installed in a housing separated from a housing of the camera 110, a housing of the radar 120, and a housing of the LiDAR 130. The controller 150 may transmit or receive data to or from the camera 110, the radar 120, or the LiDAR 130 through a wide-bandwidth network.

At least some of the camera 110, the radar 120, the LiDAR 130, the communicator 140, and the controller 150 may be integrally provided. For example, the camera 110 and the controller 150 may be provided in one housing, the radar 120 and the controller 150 may be provided in one housing, the LiDAR 130 and the controller 150 may be provided in one housing, or the communicator 140 and the controller 150 may be provided in one housing.

The camera 110 may capture surroundings of the vehicle 1 and acquire image data of the surroundings of the vehicle 1. For example, the camera 110 may be installed on a front windshield of the vehicle 1 as shown in FIG. 2 and may have a forward field of view 110*a* of the vehicle 1.

The camera 110 may include a plurality of lenses and an image sensor. The image sensor may include a plurality of photodiodes for converting light into electrical signals, and the plurality of photodiodes may be arranged in the form of a two-dimensional matrix.

The image data may include information on other vehicles, pedestrians, cyclists, or lane lines positioned around the vehicle 1.

The apparatus for driver assistance 100 may include an image processor for processing the image data of the camera 110, and the image processor may be, for example, provided integrally with the camera 110 or integrally with the controller 150.

The image processor may acquire image data from an image sensor of the camera 110 and detect and identify nearby objects of the vehicle 1 based on the processing of the image data. For example, the image processor may generate tracks representing nearby objects of the vehicle 1 using image processing and may classify the tracks. The image processor may identify whether the track is another vehicle, a pedestrian, or a cyclist, and the like and give an identification code to the track.

The image processor may transmit data on tracks around the vehicle 1 (or positions and classifications of the tracks) (hereinafter referred to as "camera track") to the controller 150.

The radar 120 may radiate transmission radio waves toward the surroundings of the vehicle 1 and detect nearby objects of the vehicle 1 based on reflected radio waves reflected from the nearby objects. For example, the radar 120 may be installed on a grille or bumper of the vehicle 1 as shown in FIG. 2 and may have a forward field of sensing 120*a* of the vehicle 1.

The radar 120 may include a transmission antenna (or a transmission antenna array) for radiating transmission radio waves toward the surroundings of the vehicle 1 and a reception antenna (or a reception antenna array) for receiving reflected radio waves reflected from objects.

The radar 120 may acquire radar data from the transmission radio waves transmitted by the transmission antenna and the reflected radio waves received by the reception antenna. The radar data may include position information (e.g., distance information) and/or speed information of objects positioned in front of the vehicle 1.

The apparatus for driver assistance 100 may include a signal processor for processing the radar data of the radar 120, and the signal processor may be, for example, provided integrally with the radar 120 or integrally with the controller 150.

The signal processor may acquire the radar data from the reception antenna of the radar 120 and generate tracks representing the objects by clustering reflection points of the reflected signal. The signal processor may, for example, acquire a distance of the track based on a time difference between a transmission time point of the transmission radio wave and a reception time point of the reflected radio wave and acquire a relative speed of the track based on a difference between a frequency of the transmission radio wave and a frequency of the reflected radio wave.

The signal processor may transmit data on the tracks (or distance and relative speed data of the tracks) (hereinafter referred to as "radar track") around the vehicle 1 acquired from the radar data to the controller 150.

The LiDAR 130 may emit light (e.g., infrared rays) toward the surroundings of the vehicle 1 and detect nearby objects of the vehicle 1 based on reflected light reflected from the nearby objects. For example, the LiDAR 130 may be installed on a roof of the vehicle 1 as shown in FIG. 2 and may have fields of view 130*a* in all directions around the vehicle 1.

The LiDAR 130 may include a light source (e.g., a light emitting diode, a light emitting diode array, a laser diode, or a laser diode array) for emitting light (e.g., infrared light) and an optical sensor (e.g., a photodiode or a photodiode array) for receiving light (e.g., infrared rays). In addition, as necessary, the LiDAR 130 may further include a driving device for rotating the light source and/or the optical sensor.

While the light source and/or the optical sensor rotates, the LiDAR 130 may emit light through the light source and receive the light reflected from objects through the optical sensor, thereby acquiring LiDAR data.

The LiDAR data may include relative positions (distances and/or directions of nearby objects) and/or relative speeds of the nearby objects of the vehicle 1.

The apparatus for driver assistance 100 may include a signal processor capable of processing the LiDAR data of the LiDAR 130, and the signal processor may be, for example, provided integrally with the LiDAR 130 or integrally with the controller 150.

The signal processor may generate tracks representing objects by clustering reflection points by the reflected light. The signal processor may, for example, acquire a distance to the object based on a time difference between a light transmission time point and a light reception time point. In addition, the signal processor may acquire a direction (or an angle) of the object with respect to a traveling direction of the vehicle 1 based on a direction in which the light source emits light when the optical sensor receives the reflected light.

The signal processor may transmit data on the tracks (or distance and relative speed data of the tracks) (hereinafter referred to as "LiDAR track") around the vehicle 1 acquired from the LiDAR data to the controller 150.

The communicator 140 may receive vehicle to everything (V2X) communication data on positions and traveling information of other vehicles around the vehicle 1 via V2X communication.

The controller 150 may be electrically connected to the camera 110, the radar 120, the LiDAR 130, and/or the communicator 140. In addition, the controller 150 may be connected to the navigation device 10, the driving device 20, the braking device 30, the steering device 40, the display device 50, the audio device 60, and/or a plurality of sensors via the vehicle communication network NT.

The controller 150 may process a camera track (or the image data) of the camera 110, a radar track (or the radar data) of the radar 120, a LiDAR track (or the LiDAR data) of the LiDAR 130, and/or the V2X communication data of the communicator 140 and provide control signals to the driving device 20, the braking device 30, and/or the steering device 40.

The controller 150 may include a processor 151 and a memory 152.

The memory 152 may store programs and/or data for processing the image data, the radar data, and/or the LiDAR data. In addition, the memory 152 may store programs and/or data for generating driving/braking/steering signals.

The memory 152 may temporarily store the image data received from the camera 110, the radar data received from the radar 120, and the LiDAR data received from the LiDAR 130, temporarily store the V2X communication data received from the communicator 140, and temporarily store the processing results of the image data, the radar data, the LiDAR data, and/or the V2X communication data of the processor 151.

In addition, the memory 152 may include a high definition (HD) map. Unlike general maps, the HD map may include detailed information on surfaces of roads or intersections, such as lane lines, traffic lights, intersections, and traffic signs. In particular, landmarks (e.g., lane lines, traffic lights, intersections, and traffic signs) that vehicles encounters while traveling are implemented in a three dimension on the HD map.

The memory 152 may include not only volatile memories, such as a static random access memory (SRAM) and a dynamic RAM (DRAM) but also non-volatile memories, such as a read only memory (ROM) and an erasable programmable ROM (EPROM).

The processor 151 may process the camera track of the camera 110, the radar track of the radar 120, the LiDAR track of the LiDAR 130, and/or the V2X communication data of the communicator 140. For example, the processor 151 may fuse the camera track, the radar track, the LiDAR track, and/or the V2X communication data and output fusion tracks.

Based on processing the fusion tracks, the processor 151 may generate a driving signal, a braking signal, and/or a steering signal for controlling the driving device 20, the braking device 30, and/or the steering device 40, respectively. For example, the processor 151 may evaluate risk of collision between the fusion tracks and the vehicle 1. The processor 151 may control the driving device 20, the braking device 30, and/or the steering device 40 to steer or brake the vehicle 1 based on the risk of collision between the fusion tracks and the vehicle 1.

The processor 151 may include the image processor for processing the image data of the camera 110, the signal processor for processing the radar data of the radar 120, the LiDAR data, and/or the V2X communication data, or a micro control unit (MCU) for generating driving, braking, and steering signals.

As described above, the controller 150 may provide the driving signal, the braking signal, or the steering signal based on the image data of the camera 110, the radar data of the radar 120, the LiDAR data of the LiDAR 130, and/or the V2X communication data.

Figure 3:
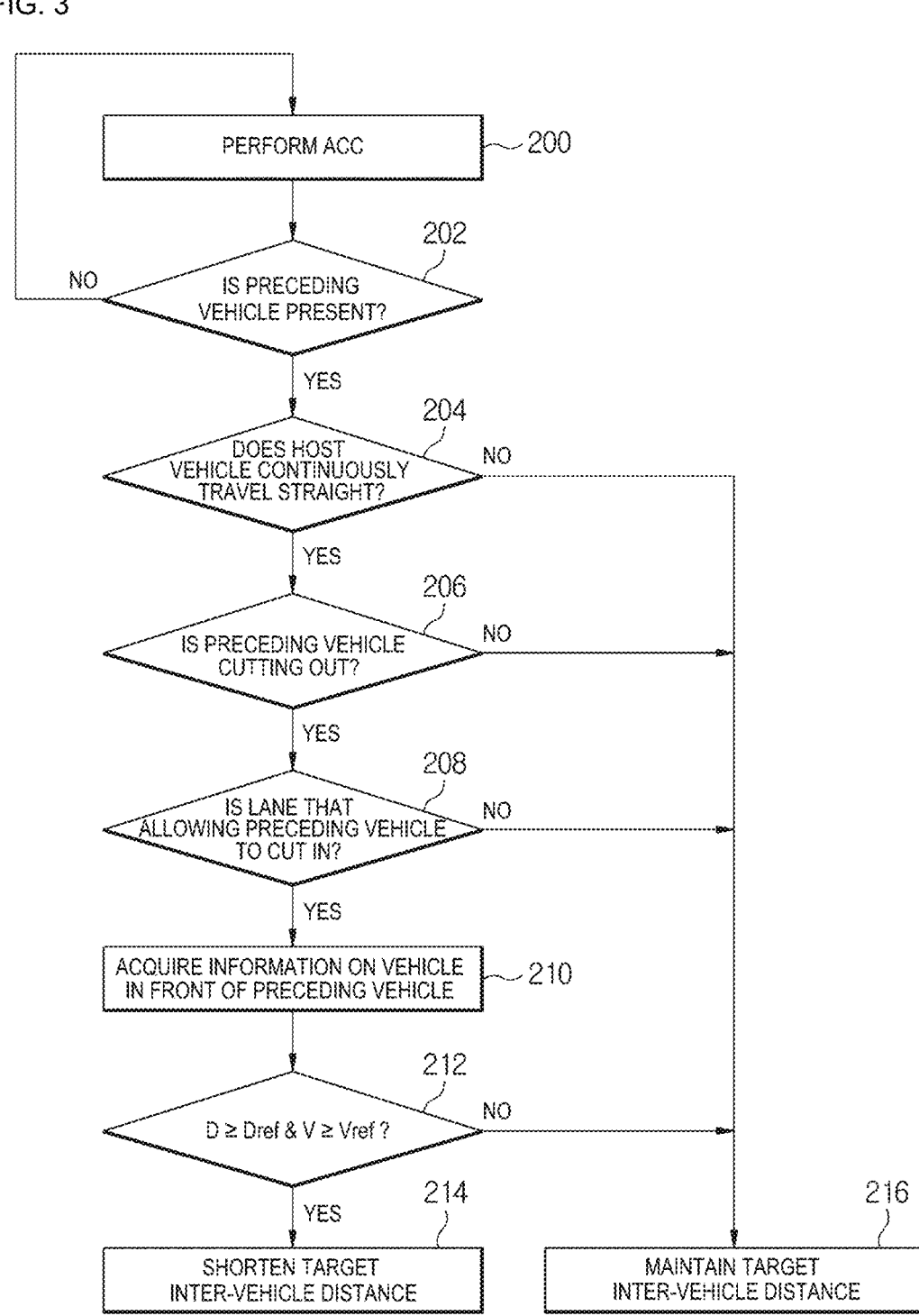
FIG. 3 is a flowchart illustrating operations of the apparatus for driver assistance according to one embodiment.

FIG. 3 is a flowchart illustrating operations of the apparatus for driver assistance according to one embodiment.

Referring to FIG. 3, the apparatus for driver assistance 100 performs the ACC (200).

When a driver inputs a target speed and a target inter-vehicle distance by manipulating a switch related to the ACC while driving the vehicle, the controller 150 may acquire the target speed and target inter-vehicle distance input by the driver and perform the ACC based thereon.

The apparatus for driver assistance 100 identifies whether a preceding vehicle is present (202).

The controller 150 identifies whether the preceding vehicle travels in front of the host vehicle 1 on a lane on which the host vehicle 1 travels.

The controller 150 may fuse at least one or all of the camera track of the camera 110, the radar track of the radar 120, the LiDAR track of the LiDAR 130, and/or the V2X communication data of the communicator 140 and identify whether the preceding vehicle travels in front of the host vehicle 1 on a lane on which the host vehicle 1 travels.

When the preceding vehicle is not present (No in 202), the apparatus for driver assistance 100 continues to perform a current ACC.

When the preceding vehicle is present (Yes in 202), the apparatus for driver assistance 100 identifies whether the host vehicle 1 continuously travels straight (204).

Even when the preceding vehicle is present, the controller 150 may continuously maintain the current ACC when a vehicle speed of the preceding vehicle is higher than a target speed of the ACC.

Figure 4:
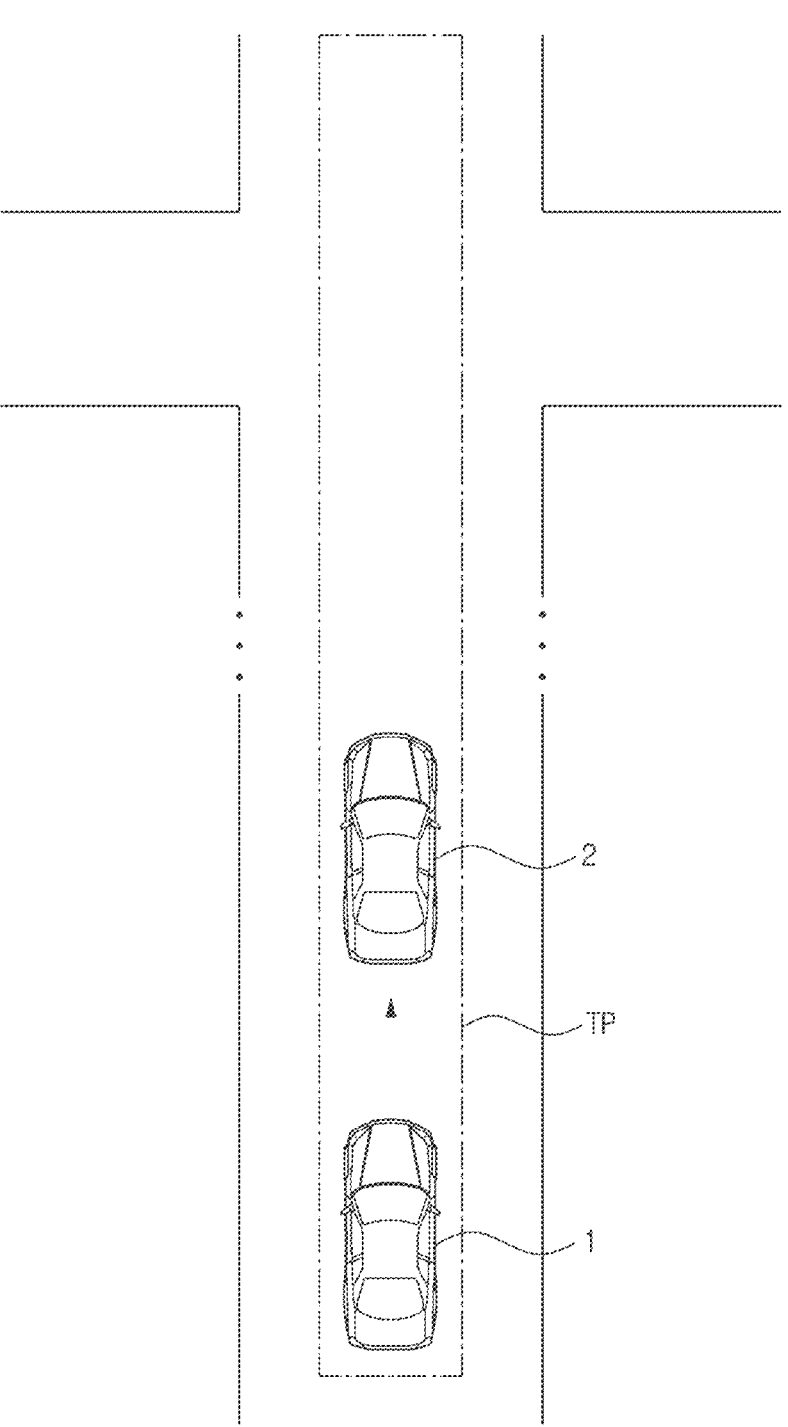
FIG. 4 is a view illustrating identifying whether a host vehicle continuously travels straight by the apparatus for driver assistance according to one embodiment.

FIG. 4 is a view illustrating identifying whether a host vehicle continuously travels straight by the apparatus for driver assistance according to one embodiment.

Referring to FIG. 4, the controller 150 may identify that the host vehicle 1 continuously travels straight when there is no intersection or traffic light in a predetermined forward section.

Meanwhile, when a destination is set in the navigation device 10, the controller 150 may identify that the host vehicle 1 continuously travels straight when an exit point at which the host vehicle 1 exits does not appear in a predetermined forward section in consideration of a traveling path TP of the host vehicle 1. The reason for determining whether the host vehicle 1 continuously travels straight is that when the host vehicle 1 cuts out of the traveling path of the host vehicle 1 by a left/right turn or exits to the exit point, it may be determined that it is not necessary to reduce a target inter-vehicle distance to a preceding vehicle 2 being currently maintained.

Referring back to FIG. 3, when the host vehicle 1 continuously travels straight, the apparatus for driver assistance 100 identifies whether the preceding vehicle is cutting out of a traveling lane (206).

The controller 150 may acquire a lateral position and a lateral speed of the preceding vehicle and whether a turn signal of the preceding vehicle is turned on and identify whether the preceding vehicle is cutting out of the traveling lane according to the lateral position and the lateral speed of the preceding vehicle and/or whether the turn signal of the preceding vehicle is turned on.

Figure 5:
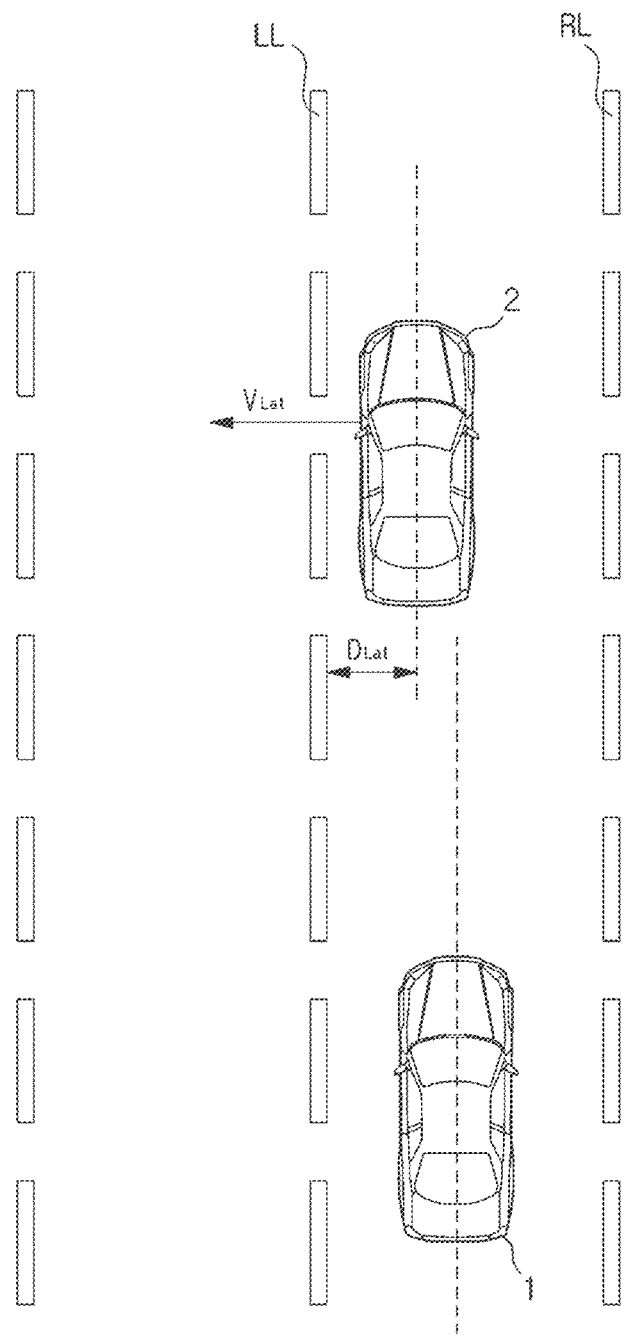
FIG. 5 is a view illustrating identifying whether a preceding vehicle is cutting out of a traveling lane by the apparatus for driver assistance according to one embodiment.

FIG. 5 is a view illustrating identifying whether a preceding vehicle is cutting out of a traveling lane by the apparatus for driver assistance according to one embodiment.

Referring to FIG. 5, when a lateral speed $V_{Lat}$ of the preceding vehicle 2 is higher than or equal to a preset speed, a lateral distance $D_{Lat}$ between the preceding vehicle 2 and a left lane line LL or a right lane line RL is smaller than or equal to a preset distance, and the turn signal is turned on, the apparatus for driver assistance 100 may identify that the preceding vehicle is cutting out of the traveling lane.

Referring back to FIG. 3, when the preceding vehicle is cutting out of the lane (Yes in 206), the apparatus for driver assistance 100 identifies whether a lane onto which the preceding vehicle enters after cutting out of the traveling lane is a lane allowing the preceding vehicle to cut in (208).

The controller 150 may identify the lane onto which the preceding vehicle enters as a lane allowing the preceding vehicle to cut in when a lane in a direction in which the preceding vehicle intends to move after cutting out of the traveling lane is not a non-entry lane such as a bus lane, a lane under construction, or a restricted lane, or a lane that is ending that means a reduction in the number of lanes within a predetermined forward distance.

When the lane onto which the preceding vehicle enters is a lane allowing the preceding vehicle to cut in (Yes in 208), the apparatus for driver assistance 100 acquires information on a vehicle positioned in front of the preceding vehicle on a lane on which the preceding vehicle travels (210).

The controller 150 may fuse at least one or all of the camera track of the camera 110, the radar track of the radar 120, the LiDAR track of the LiDAR 130, and/or the V2X communication data of the communicator 140 and acquire information on a vehicle in front of the preceding vehicle including whether the vehicle positioned in front of the preceding vehicle on a lane on which the preceding vehicle travels and a position and speed of the vehicle in front of the preceding vehicle.

The apparatus for driver assistance 100 identifies whether a relative distance D between the host vehicle 1 and the vehicle in front of the preceding vehicle is greater than or equal to a preset distance $D_{ref}$ and a relative speed V between the host vehicle 1 and the vehicle in front of the preceding vehicle is greater than or equal to a preset speed $V_{ref}$ (212).

Figure 6:
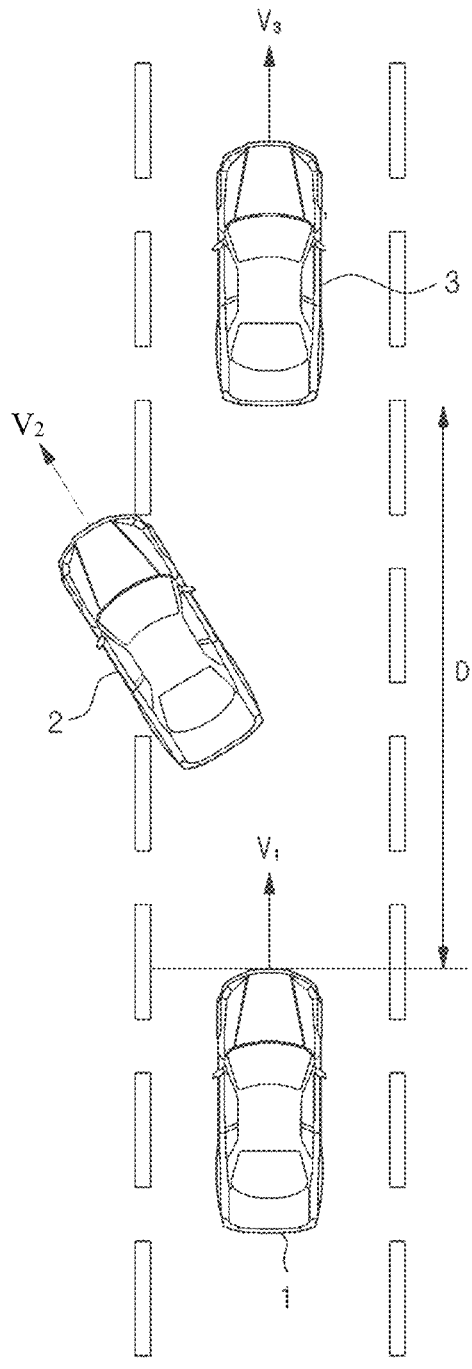
FIG. 6 is a view for describing a relative distance and a relative speed between a host vehicle and a vehicle positioned in front of a preceding vehicle calculated by the apparatus for driver assistance according to one embodiment when the preceding vehicle is cutting out of a traveling lane.

FIG. 6 is a view for describing a relative distance and a relative speed between a host vehicle and a front vehicle of a preceding vehicle calculated by the apparatus for driver assistance according to one embodiment when the preceding vehicle is cutting out of a traveling lane.

Referring to FIG. 6, it is assumed that the host vehicle 1, the preceding vehicle 2, and a vehicle 3 in front of preceding vehicle 2 are traveling on the same lane. In addition, it is assumed that the preceding vehicle 2 is cutting out of the traveling lane.

A speed of the host vehicle 1 is indicated by $V_1$, a speed of the preceding vehicle 2 is indicated by $V_2$, and a speed of the preceding vehicle 3 is indicated by $V_3$. A relative distance between the host vehicle 1 and the vehicle 3 in front of the preceding vehicle is indicated by D.

The controller 150 acquires the relative distance D between the host vehicle 1 and the vehicle 3 in front of the preceding vehicle and a relative speed V ($V_1$-$V_3$) between the host vehicle 1 and the vehicle 3 in front of the preceding vehicle according to the information on the vehicle 3 in front of the preceding vehicle.

The controller 150 may identify whether the acquired relative distance D is greater than or equal to the preset distance $D_{ref}$ and whether the acquired relative speed V is higher than or equal to the preset speed $V_{ref}$.

Referring back to FIG. 3, when the relative distance D between the host vehicle 1 and the vehicle in front of the preceding vehicle is greater than or equal to the preset distance $D_{ref}$ and the relative speed V between the host vehicle 1 and the vehicle in front of the preceding vehicle is higher than or equal to the preset speed $V_{ref}$ (Yes in 212), the apparatus for driver assistance 100 shortens the target inter-vehicle distance between the host vehicle and the preceding vehicle (214). In addition, the apparatus for driver assistance 100 performs the ACC according to the shortened target inter-vehicle distance. The apparatus for driver assistance 100 may determine that the cut-out has been completed when the preceding vehicle completely cuts out of the traveling lane or departs from an ACC target region.

Meanwhile, when the host vehicle 1 does not continuously travel straight (No in 204), the preceding vehicle is not cutting out of the traveling lane (No in 206), a lane onto which the preceding vehicle enters after cutting out of the traveling lane is not a lane allowing the preceding vehicle to cut in (No in 208), or conditions in which the relative distance D between the host vehicle 1 and the vehicle in front of the preceding vehicle is greater than or equal to the preset distance $D_{ref}$ and the relative speed V between the host vehicle 1 and the vehicle in front of the preceding vehicle is higher than or equal to the preset speed $V_{ref}$ are not satisfied (No in 212), the apparatus for driver assistance 100 continuously maintains the target inter-vehicle distance between the host vehicle and the preceding vehicle (216). In addition, the apparatus for driver assistance 100 performs the ACC according to an original target inter-vehicle distance.

Figure 7:
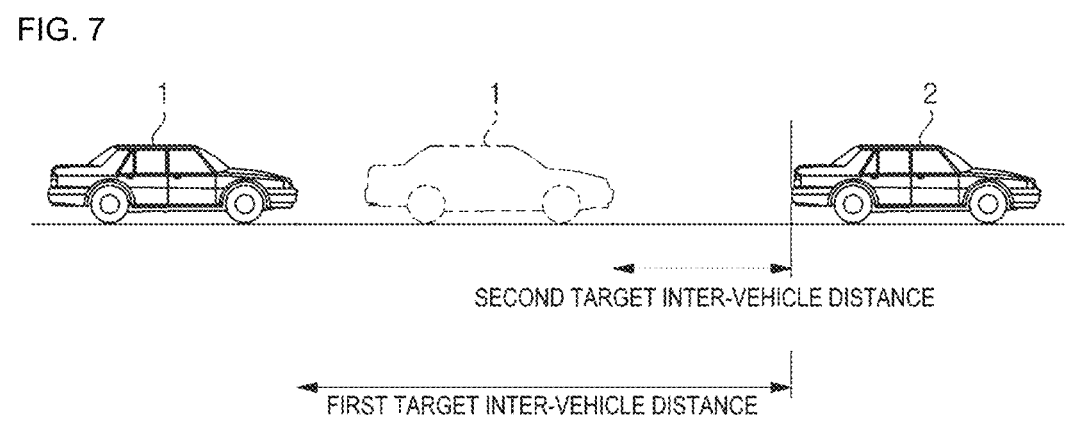

FIG. 7 is a view illustrating correcting a target inter-vehicle distance by the apparatus for driver assistance according to one embodiment.

Referring to FIG. 7, a first target inter-vehicle distance is an inter-vehicle distance before the target inter-vehicle distance between the host vehicle 1 and the preceding vehicle 2 is corrected.

A second target inter-vehicle distance is an inter-vehicle distance obtained by correcting the target inter-vehicle distance between the host vehicle 1 and the preceding vehicle 2.

In case that, during the ACC, the preceding vehicle 2 travels in front of the host vehicle 1 on a lane on which the host vehicle 1 travels, the host vehicle 1 continuously travels straight, the preceding vehicle is cutting out of the traveling lane, a lane onto which the preceding vehicle enters after cutting out of the traveling lane is a lane allowing the preceding vehicle to cut in, and the vehicle 3 in front of the preceding vehicle 2 does not travel in front of the preceding vehicle on the lane on which the preceding vehicle travels, or the vehicle 3 is in front of the preceding vehicle, when the relative distance D between the host vehicle 1 and the vehicle 3 in front of the preceding vehicle is greater than or equal to the preset distance $D_{ref}$ and the relative speed V between the host vehicle 1 and the vehicle 3 in front of the preceding vehicle is higher than or equal to the preset speed $V_{ref}$, the target inter-vehicle distance of the host vehicle is changed from the first target inter-vehicle distance to the second target inter-vehicle distance, thereby shortening the inter-vehicle distance.

A reduction rate of the second target inter-vehicle distance to the first target inter-vehicle distance may be set to a preset ratio or may also be determined according to the relative distance D and the relative speed V. For example, the greater the relative distance D and the higher the relative speed V, the greater the reduction rate.

As described above, in the case of a situation in which, in the state in which the host vehicle continuously travels straight during the ACC, the preceding vehicle is cutting out from a traveling lane to a lane allowing the preceding vehicle to cut in and a degree of risk of collision with the vehicle in front of the preceding vehicle is low, it is possible to shorten the target inter-vehicle distance between the host vehicle and the preceding vehicle from a first target inter-vehicle distance value to a second target inter-vehicle distance value smaller than the first target inter-vehicle distance value. Therefore, even when the preceding vehicle has not completely cut out of the traveling lane, the host vehicle approaches the preceding vehicle by performing the ACC according to the second target inter-vehicle distance value and increasing the speed by acceleration. Therefore, it is possible to relatively smoothly control changes in an acceleration and deceleration of the host vehicle compared to a case in which the preceding vehicle suddenly accelerates and then suddenly decelerates after completely cutting out of the traveling lane, thereby not only preventing a great sense of heterogeneity to the driver but also improving fuel efficiency.

As is apparent from the above description, it is possible to prevent unnecessary deceleration and acceleration of a host vehicle when a preceding vehicle cuts out of a traveling lane on which the host vehicle travels.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus comprising:

a sensor including at least one of a camera, a radar, and a light detection and ranging (LiDAR); and a controller configured to detect a preceding vehicle that travels in front of a host vehicle based on data output from the sensor, and perform adaptive cruise control (ACC) that maintains a first target inter-vehicle distance between the host vehicle and the preceding vehicle, wherein the controller is configured to:

identify whether the host vehicle is continuously traveling straight;

if the host vehicle is identified as continuously traveling straight, identify whether the preceding vehicle is cutting out of a traveling lane and into another lane according to movement of the preceding vehicle during the ACC;

if the preceding vehicle is identified as cutting out of the traveling lane, identify whether the another lane to which the preceding vehicle is cutting in is a lane allowing the preceding vehicle to cut in; and if the another lane to which the preceding vehicle is cutting in is identified as the lane allowing the preceding vehicle to cut in, acquire a relative distance and a relative speed between the host vehicle and another vehicle located in front of the preceding vehicle on a lane on which the preceding vehicle travels, determine whether the relative distance is greater than or equal to a preset distance and the relative speed is greater than or equal to a preset speed, and only when the relative distance and the relative speed satisfy the preset distance and the preset speed, shorten the target inter-vehicle distance of the ACC from a first target inter-vehicle distance to a second target inter-vehicle distance smaller than the first target inter-vehicle distance, and otherwise maintain the first target inter-vehicle distance without shortening.

2. The apparatus of claim 1, wherein the controller is configured to:

activate the lane change prediction of the preceding vehicle only when the host vehicle is continuously traveling straight; and determine whether the host vehicle is continuously traveling straight based on at least one of navigation information and road conditions in a forward region.

3. The apparatus of claim 1, wherein the controller is configured to:

identify whether there are intersections or traffic lights in a predetermined forward section; and if there are no intersections or traffic lights in the predetermined forward section, identify that the host vehicle is continuously traveling straight.

4. The apparatus of claim 1, wherein the controller is configured to:

identify whether an exit point at which the host vehicle exits is present in a predetermined forward section based on a traveling path to a destination set in a navigation device; and identify that the host vehicle continuously travels straight on the basis of no exit point in the predetermined forward section.

5. The apparatus of claim 1, wherein the controller is configured to:

acquire a lateral position of the preceding vehicle and a lateral speed of the preceding vehicle, identify whether a turn signal of the preceding vehicle is turned on; and identify whether the preceding vehicle is cutting out of the traveling lane according to the lateral position of the preceding vehicle, the lateral speed of the preceding vehicle and the identifying of whether the turn signal of the preceding vehicle is turned on.

6. The apparatus of claim 5, wherein the controller is configured to identify that the preceding vehicle is cutting out of the traveling lane in response to at least one of:

a lateral speed of the preceding vehicle being higher than or equal to a preset speed, a lateral distance between a lane marker in the direction in which the preceding vehicle laterally moves and the preceding vehicle being smaller than or equal to a preset distance, and the identifying of that the turn signal is turned on.

7. The apparatus of claim 1, wherein the controller is configured to:

identify whether the another lane to which the preceding vehicle is cutting in is a lane that allows the preceding vehicle to cut in by determining whether the another lane is not a bus lane, a lane under construction, a restricted lane, or a lane that is ending.

8. A method comprising:

detecting a preceding vehicle that travels in front of a host vehicle based on data output from at least one of a camera, a radar, and a light detection and ranging (LiDAR);

performing adaptive cruise control (ACC) that maintains a target inter-vehicle distance between the host vehicle and the preceding vehicle;

identifying whether the host vehicle is continuously traveling straight;

if the host vehicle is identified as continuously traveling straight, identifying whether the preceding vehicle is cutting out of a traveling lane and into another lane during the ACC according to movement of the preceding vehicle;

if the preceding vehicle is identified as cutting out of the traveling lane, identifying whether the another lane to which the preceding vehicle is cutting in is a lane allowing the preceding vehicle to cut in; and if the another lane is identified as allowing the preceding vehicle to cut in, acquiring a relative distance and a relative speed between the host vehicle and another vehicle located in front of the preceding vehicle on a lane on which the preceding vehicle travels, determining whether the relative distance is greater than or equal to a preset distance and the relative speed is greater than or equal to a preset speed, and only when the relative distance and the relative speed satisfy the preset distance and the preset speed, shortening the target inter-vehicle distance of the ACC from a first target inter-vehicle distance to a second target inter-vehicle distance smaller than the first target inter-vehicle distance, and otherwise maintaining the first target inter-vehicle distance without shortening.

9. The method of claim 8, wherein the identifying of whether the preceding vehicle is cutting out of the traveling lane comprises:

activating the lane change prediction of the preceding vehicle only when the host vehicle is continuously traveling straight, and determining whether the host vehicle is continuously traveling straight based on at least one of navigation information and road conditions in a forward region.

10. The method of claim 8, wherein the identifying of whether the host vehicle continuously travels straight comprises:

identifying whether there are intersections or traffic lights in a predetermined forward section; and if there are no intersections or traffic lights in the predetermined forward section, identifying that the host vehicle continuously travels straight.

11. The method of claim 8, wherein the identifying of whether the host vehicle continuously travels straight comprises:

identifying whether an exit point at which the host vehicle exits is present in a predetermined forward section based on a traveling path to a destination set in a navigation device, and identifying that the host vehicle continuously travels straight on the basis of no exit point in the predetermined forward section.

12. The method of claim 8, wherein the identifying of whether the preceding vehicle is cutting out of the traveling lane comprises:

acquiring a lateral position of the preceding vehicle and a lateral speed of the preceding vehicle, identifying whether a turn signal of the preceding vehicle is turned on, and identifying whether the preceding vehicle is cutting out of the traveling lane according to the lateral position of the preceding vehicle, the lateral speed of the preceding vehicle and the identifying of whether the turn signal of the preceding vehicle is turned on.

13. The method of claim 12, wherein the identifying of whether the preceding vehicle is cutting out of the traveling lane comprises identifying that the preceding vehicle is cutting out of the traveling lane in response to at least one of:

a lateral speed of the preceding vehicle being higher than or equal to a preset speed, a lateral distance between a lane marker in the direction in which the preceding vehicle laterally moves and the preceding vehicle being smaller than or equal to a preset distance, and the identifying of that the turn signal is turned on.

14. The method of claim 8, wherein the identifying of whether the another lane to which the preceding vehicle is cutting in is the lane allowing the preceding vehicle to cut in comprises:

determining whether the another lane is not a bus lane, a lane under construction, a restricted lane, or a lane that is ending; and if the another lane is determined not to be any of the above, identifying that the lane allows the preceding vehicle to cut in.

15. A non-transitory computer-readable record medium comprising instructions or execution code for:

detecting a preceding vehicle that travels in front of a host vehicle based on data output from at least one of a camera, a radar, and a light detection and ranging (LiDAR);

performing adaptive cruise control (ACC) that maintains a target inter-vehicle distance between the host vehicle and the preceding vehicle;

identifying whether the host vehicle is continuously traveling straight;

if the host vehicle is identified as continuously traveling straight, identifying whether the preceding vehicle is cutting out of a traveling lane and into another lane during the ACC according to movement of the preceding vehicle;

if the preceding vehicle is identified as cutting out of the traveling lane, identifying whether the another lane to which the preceding vehicle is cutting in is a lane allowing the preceding vehicle to cut in; and if the another lane is identified as allowing the preceding vehicle to cut in, acquiring a relative distance and a relative speed between the host vehicle and another vehicle located in front of the preceding vehicle on a lane on which the preceding vehicle travels, determining whether the relative distance is greater than or equal to a preset distance and the relative speed is greater than or equal to a preset speed, and only when the relative distance and the relative speed satisfy the preset distance and the preset speed, shortening the target inter-vehicle distance of the ACC from a first target inter-vehicle distance to a second target inter-vehicle distance smaller than the first target inter-vehicle distance, and otherwise maintaining the first target inter-vehicle distance without shortening.

* * * * *